United States Patent [19]

Wood

[11] Patent Number: 4,912,649
[45] Date of Patent: Mar. 27, 1990

[54] ACCELERATING LEARNING IN NEURAL NETWORKS

[75] Inventor: Laurence F. Wood, Medway, Mass.

[73] Assignee: GTE Government Systems Corporation, Waltham, Mass.

[21] Appl. No.: 284,155

[22] Filed: Dec. 14, 1988

[51] Int. Cl.[4] ............................................. G06F 15/18
[52] U.S. Cl. ..................................... 364/513; 364/200; 364/221.3; 364/274.9; 364/900; 364/916.2; 364/972.4
[58] Field of Search ............... 364/513, 800, 807, 200, 364/221.1, 221.3, 274.9, 276.6, 900, 916, 916.2, 917.95; 382/14, 15

[56] References Cited

U.S. PATENT DOCUMENTS

| | | | |
|---|---|---|---|
| 3,533,072 | 10/1970 | Clapper | 364/900 |
| 3,950,733 | 4/1976 | Cooper | 364/900 |
| 4,254,474 | 3/1981 | Cooper | 364/900 |
| 4,326,259 | 4/1982 | Cooper et al. | 364/900 |
| 4,660,166 | 4/1987 | Hopfield | 364/807 |
| 4,807,168 | 2/1989 | Moopenn et al. | 364/807 |

OTHER PUBLICATIONS

Neural Networks, Part 2, Wasserman et al., IEEE Expert, Spring 1988, pp. 10–15.
"An Introduction of Computing with Neural Nets," Lippmann, IEEE, ASSP Magazine, Apr. 1987, pp. 4–22.
"Experiments on Learning by Bark Proparation," Plaut et al., Carnegie-Mellon Univ., Pittsburgh, Pa., Dept of Computer Science, pp. 1–47, 6–86.
"Accelerating the Convergence of the Back Propagation Method," Vogl et al., Bio. Cybern. 59, 257–263, Spring 1988.
"Back-Propagation Networks for Event-Driven Temporal Sequence Processing", Shimohara et al., IEEE International Conference on Neural Networks, 7-88, pp. 665–672.
"Increased Effectiveness of Learning by Local Neural Feedback," Sobajic et al., Abstract of First INNS Meeting, vol. 1, Supp. 1, 1988, p. 222.

*Primary Examiner*—John R. Lastova

[57] ABSTRACT

A method of accelerating the training of an artificial neural network uses a computer configured as an artificial neural network with a network input and a network output, and having a plurality of interconnected units arranged in layers including an input layer and an output layer. Each unit has a multiplicity of unit inputs and a set of variables for operating upon the unit inputs to provide a unit output. A plurality of examples are serially provided to the network input and the network output is observed. The computer is programmed with a back propagation algorithm for adjusting each set of variables in response to feedback representing differences between the network output for each example and the desired output. The examples are iterated while those values which change are identified. The examples are reiterated and the algorithm is applied to only those values which changed in a previous iteration.

1 Claim, 13 Drawing Sheets

```
FOR k = mi TO uc-1
                uc-1
        on_k  <-   Σ   out_i * ws_i,k + ot_k
                i=0
        out_k <- 1/1+e^(-(on_k))
FOR k = uc-1 DOWNTO mi
    IF (unit k is gives network output) THEN
        pf_k <- (rf_k - out_k)

ELSE
        pf_k <- 0

FOR i = mi TO uc-1
        IF (unit k gives input to unit i) THEN
            pf_k <- pf_k + ws_k,i * pf_i
        pf_k <- pf_k * out_k(1 - out_k)
    FOR i = 0 TO uc-1
        IF (unit i gives input to unit k) THEN
            ws_i,k <- ws_i,k + d * pf_k * out_k ot_k <-  ot_k + d * pf_k
```

```
FOR k = mi TO uc-1
                uc-1
       on_k <- Σ   out_i*ws_i,k + ot_k
               i=0
       out_k <- tanh(on_k)
                uc-1
       pn_k <- Σ   out_i*vs_i,k + pt_k
               i=0
       pd_k <- tanh(pn_k)
       dt_k <- do*(pd_k - sp_k)
       sp_k <- sp_k + dt_k
FOR k = uc-1 DOWNTO mi
    IF (unit k is gives nextwork output) THEN
         pf_k <- (rf_k - out_k)
    ELSE
         pf_k <- 0
    FOR i = mi TO uc-1
         IF (unit k gives input to unit i) THEN
              pf_k <- pf_k + ws_k,i*sf_i
    pf_k <- pf_k*(1 - out_k^2)
    sf_k <- pf_k + dt_k
    FOR i=0 TO uc-1
         IF (unit i gives input to unit k) THEN
              ws_i,k <- ws_i,k + d_1*out_i*sf_k
              vs_i,k <- vs_i,k + d_2*out_i*sf_k
         ot_k <- ot_k + d_1*sf_k
         pt_k <- pt_k + d_2*sf_k
```

FIG. 7

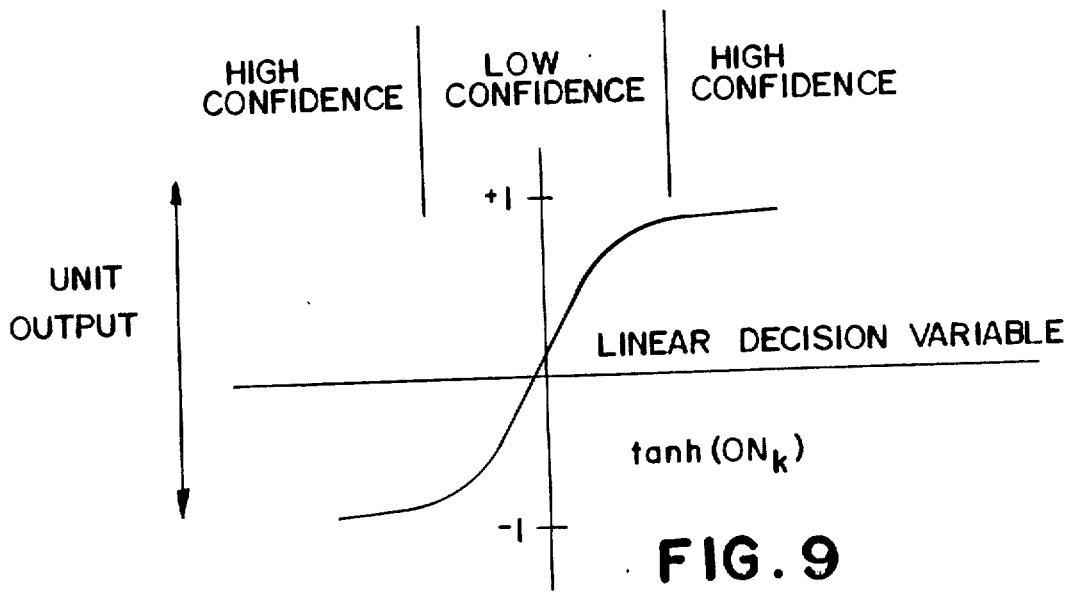

FIG. 9

Note:
START To STOP is iterated until $\forall i / \pi i \leq i < vc$, if unit i is an output unit
$rf_i - out_i < \varepsilon$ for some $\varepsilon$ small

FIG. 8-2

INITIAL CONDITIONS:

$ni$ = NUMBER OF NETWORK INPUT UNITS
$uc$ = TOTAL NUMBER OF NETWORK UNITS $$\forall_{i,j} \mid 0 \leq i, j < uc$$

$$WS_{i,j} = VS_{i,j} = \begin{cases} 0.0 \text{ IF UNIT } i \text{ IS NOT CONNECTED TO UNIT } j \\ X \text{ WHERE X IS A RANDOM NUMBER} \\ \quad |-r \leq x \leq r \text{ for same } r \end{cases}$$

$ot_i = pt_i = x$ random as above $sp_i = 0.0$ $\forall i \mid 0 \leq i < ni$
$\quad out_i =$ environmental input $_i$ $\forall i \mid ni \leq i < uc$
$\quad rf_i = \begin{cases} 0.0 \text{ if unit } i \text{ is not a network output} \\ \text{desired environmental output}_i \end{cases}$ $d0, d1, d2$ are constants which are chosen for each run

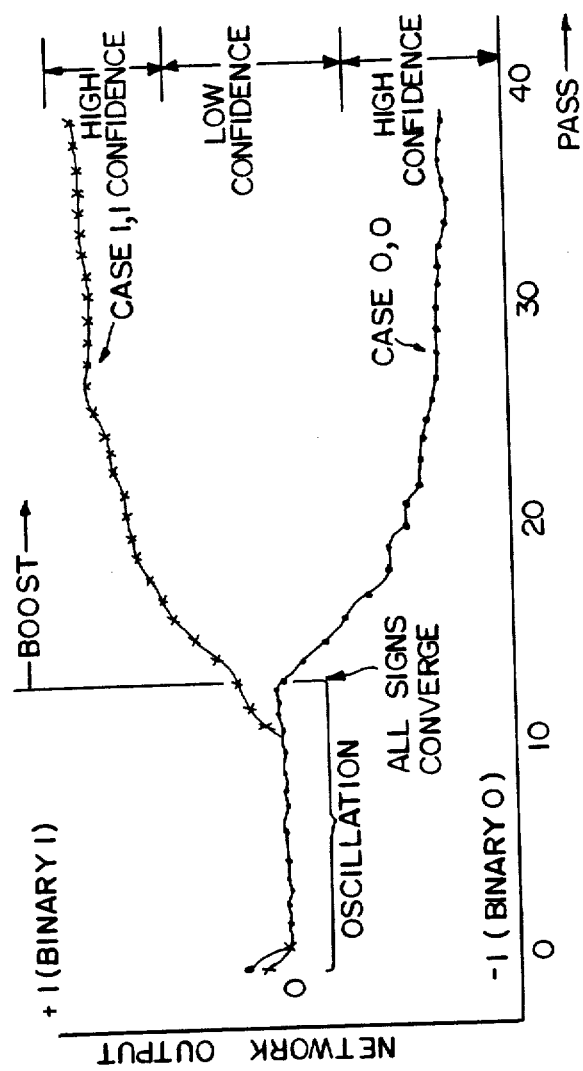
FIG. 14
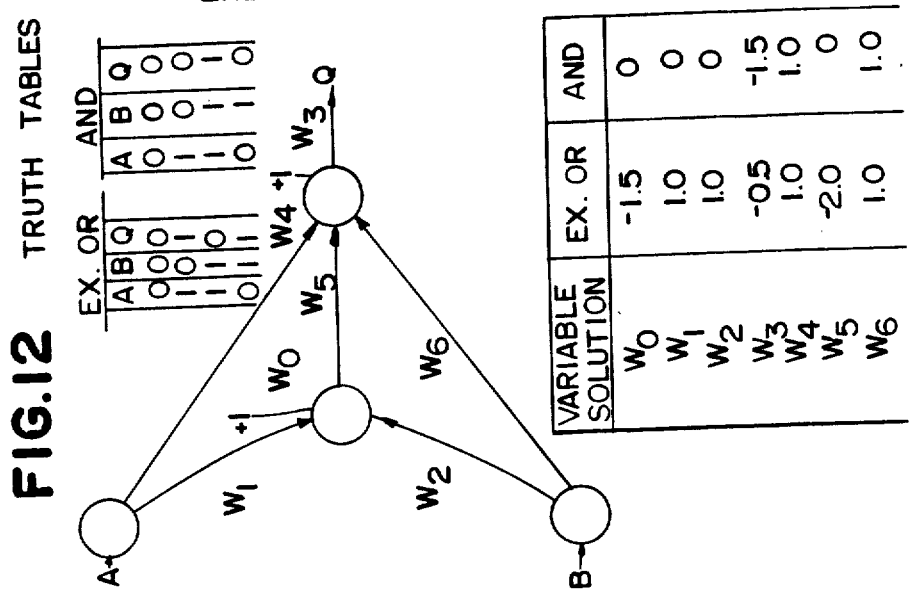
FIG. 12  TRUTH TABLES

FIG. 13-1

Note:
−1 IS BINARY 0
+1 IS BINARY 1 pass 1
case 0 0: 0.194062
case 1 0: 0.105296
case 1 1: 0.0413535
case 0 1: 0.126929 pass 2
case 0 0: −0.033041
case 1 0: −0.0393275
case 1 1: −0.0516748
case 0 1: −0.047561 pass 3
case 0 0: 0.0454128
case 1 0: 0.0384007
case 1 1: 0.0256059
case 0 1: 0.031322 pass 4
case 0 0: 0.00292888
case 1 0: −0.00892182
case 1 1: −0.0214669
case 0 1: −0.00907738 pass 5
case 0 0: 0.0244889
case 1 0: 0.0196514
case 1 1: 0.00291187
case 0 1: 0.0104738 pass 6
case 0 0: 0.0130614
case 1 0: 0.00428696
case 1 1: −0.013064
case 0 1: 0.00189558 pass 7
case 0 0: 0.0202468
case 1 0: 0.0165656
case 1 1: −0.00718804
case 0 1: 0.00905075 pass 8
case 0 0: 0.0185971
case 1 0: 0.0154663
case 1 1: −0.0159122
case 0 1: 0.0119465 pass 9
case 0 0: 0.0246298
case 1 0: 0.0283405
case 1 1: −0.0224712
case 0 1: 0.0233813 pass 10
case 0 0: 0.0299951
case 1 0: 0.0439453
case 1 1: −0.0419223
case 0 1: 0.0449011 pass 11
case 0 0: 0.0386575
case 1 0: 0.0793692
case 1 1: −0.0757455
case 0 1: 0.0892813 pass 12
case 0 0: 0.0328168
case 1 0: 0.136956
case 1 1: −0.136216
case 0 1: 0.159602 pass 13         ⎫
case 0 0: −0.0133214   ⎪ SIGNS
case 1 0: 0.223565      ⎬ CONVERGE
case 1 1: −0.222323     ⎪
case 0 1: 0.237001      ⎭ pass 14         BOOST
case 0 0: −0.111334    IMPLIMENTED
case 1 0: 0.313496
case 1 1: −0.316828
case 0 1: 0.318125 pass 15
case 0 0: −0.214844
case 1 0: 0.407037
case 1 1: −0.4104
case 0 1: 0.404668 pass 16
case 0 0: −0.325603
case 1 0: 0.479313
case 1 1: −0.488037
case 0 1: 0.477993 pass 17
case 0 0: −0.392128
case 1 0: 0.552955
case 1 1: −0.560249
case 0 1: 0.54947 pass 18                CONTINUED
case 0 0: −0.4847
case 1 0: 0.592573
case 1 1: −0.603813
case 0 1: 0.590841 pass 19 case 0 0: -0.504685
case 1 0: 0.649621
case 1 1: -0.659004
case 0 1: 0.64748 pass 20 case 0 0: -0.582875
case 1 0: 0.668231
case 1 1: -0.680091
case 0 1: 0.666663 pass 21 case 0 0: -0.587757
case 1 0: 0.70983
case 1 1: -0.71996
case 0 1: 0.708404 pass 22 case 0 0: -0.637079
case 1 0: 0.725005
case 1 1: -0.736159
case 0 1: 0.723831 pass 23 case 0 0: -0.651039
case 1 0: 0.74988
case 1 1: -0.760186
case 0 1: 0.74885 pass 24 case 0 0: -0.675728
case 1 0: 0.76587
case 1 1: -0.77604
case 0 1: 0.764985 pass 25 case 0 0: -0.692654
case 1 0: 0.781716
case 1 1: -0.79142
case 0 1: 0.780943 pass 26 case 0 0: -0.708429
case 1 0: 0.795287
case 1 1: -0.804549
case 0 1: 0.794611 pass 27 case 0 0: -0.722157
case 1 0: 0.807445
case 1 1: -0.816238
case 0 1: 0.806851 pass 28 case 0 0: -0.734334
case 1 0: 0.818365
case 1 1: -0.826683
case 0 1: 0.817842 pass 29 case 0 0: -0.745203
case 1 0: 0.828243
case 1 1: -0.83609
case 0 1: 0.827782 pass 30 case 0 0: -0.754966
case 1 0: 0.837234
case 1 1: -0.844619
case 0 1: 0.836828 pass 31 case 0 0: -0.763785
case 1 0: 0.845463
case 1 1: -0.852399
case 0 1: 0.845104 pass 32 case 0 0: -0.771789
case 1 0: 0.853031
case 1 1: -0.859536
case 0 1: 0.852715 pass 33 case 0 0: -0.779087
case 1 0: 0.860021
case 1 1: -0.866116
case 0 1: 0.859745 pass 34 case 0 0: -0.785767
case 1 0: 0.866505
case 1 1: -0.87221
case 0 1: 0.866264 pass 35 case 0 0: -0.791902
case 1 0: 0.87254
case 1 1: -0.877877
case 0 1: 0.872332 pass 36 case 0 0: -0.797555
case 1 0: 0.878178
case 1 1: -0.883167
case 0 1: 0.877998 pass 37 case 0 0: -0.802779
case 1 0: 0.883458
case 1 1: -0.888123
case 0 1: 0.883307 pass 38 case 0 0: -0.807618
case 1 0: 0.888419
case 1 1: -0.892778
case 0 1: 0.888292 pass 39 case 0 0: -0.81211
case 1 0: 0.893091
case 1 1: -0.897166
case 0 1: 0.892987

FIG.13-2

```
FOR k = mi TO uc-1
                uc-1
    on_k <- Σ   out_i*ws_{i,k} + ot_k + d_6*noise_k
              i=0
    out_k <- tanh(on_k)
                uc-1
    pn_k <- Σ   out_i*vs_{i,k} + pt_k + d_6*noise_k
              i=0
    pd_k <- tanh(pn_k)
    op   <- sp_k
    sp_k <- sp_k + d_0*(pd_k - sp_k)
    dt_k <- d_1*sp_k - op
    FOR i = 0 TO uc-1
        e_{i,k} <- e_{i,k} + d_2*(out_i*out_k - e_{i,k})
    p_k <- p_k + d_3*(out_k - p_k)
    et_k <- et_k + d_2*(out_k - et_k)
FOR k = uc-1 DOWNTO mi
    IF (unit k is gives nextwork output) THEN
        pf_k <- (rf_k - out_k)
    ELSE
        pf_k <- 0
    FOR i = mi TO uc-1
        IF (unit k gives input to unit i) THEN
            pf_k <- pf_k + ws_{k,i}*sf_i
    pf_k <- pf_k*(1 - out_k^2)
    sf_k <- d_6*pf_k + dt_k
    FOR i=0 TO uc-1
        IF (unit i gives input to unit k) THEN
            ws_{i,k} <- ws_{i,k} + d_4*e_{i,k}*sf_k
            vs_{i,k} <- vs_{i,k} + d_5*p_i*sf_k
    ot_k <- ot_k + d_4*et_k*sf_k
    pt_k <- pt_k + d_5*sf_k
```

FIG. 15

Note:
START To STOP is iterated until $\forall i / \lambda i \leq i < vc$, if unit i is an output unit
$rf_i - out_i < \varepsilon$ for some $\varepsilon$ small

FIG. 16-2

INITIAL CONDITIONS:

ni = NUMBER OF NETWORK INPUT UNITS
uc = TOTAL NUMBER OF NETWORK UNITS $$v_{i,j} \mid 0 \leq i, j < uc$$

$$ws_{i,j} = vs_{i,j} = \begin{cases} 0.0 & \text{IF UNIT } i \text{ IS NOT CONNECTED TO UNIT } j \\ x & \text{WHERE X IS A RANDOM NUMBER} \\ & |-r \leq x \leq r \text{ for same } r \end{cases}$$

$ot_i = pt_i = x$, random as above
$e_{ij} = 0.0$
$sp_i = p_i = et_i = 0.0$ $\forall i \mid 0 \leq i < ni$
   $out_i$ = environmental input$_i$ $\forall i \mid ni \leq i < uc$
   $rf_i = \begin{cases} 0.0 & \text{if unit } i \text{ is not a network output} \\ & \text{desired environmental output}_i \end{cases}$ $d\emptyset$, $d1$, ..... $d8$ are constants which are chosen for each run

ACCELERATING LEARNING IN NEURAL NETWORKS

INFORMATION ON COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights rights whatsoever.

Related Copending Applications

Ser. No. 284156, filed concurrently with this for "Trainable Neural Network" is concerned with neural networks having units within real time and predictive variables;

Ser. No. 284157, filed concurrently with this for "Training Neural Networks", is concerned with a method of training neural networks which have units with real time and predictive variables;

Ser. No. 284149, filed concurrently with this for "Neural Network Training Tool", is concerned with a method of using a software tool used to generate values for pretraining computers;

Ser. No. 284148, filed concurrently with this for "Speeding Learning in Neural Networks", is concerned with a method of converging back propagation algorithms;

Ser. No. 284150, filed concurrently with this for "Adjusting Neural Networks" is concerned with accelerating the timing of neural networks by calculating and accumulating a number of proposed changes to a value matrix during a corresponding number of iteratives and applying the accumulated changes to the value matrix.

Ser. No. 284155, filed concurrently with this for "Fast Neural Network Training, is concerned with enhancing training feedback signals based on confidence during training;

Ser. No. 284145, filed concurrently herewith for "Neural Networks Learning Method" is concerned with another method of strengthening feedback signals during training based upon the product of a unit's input and outputs; and Ser. No. 284152, filed concurrently herewith for "Optimizing Neural Network Solutions" is concerned with a method of avoiding local solutions to problems by introducing a small amount of noise.

BACKGROUND OF THE INVENTION

This invention pertains to computer systems and more particularly is concerned with artificial neural networks. Artificial neural networks (also called connectionist networks) are powerful information processors. One advantage of neural networks is their general applicability to many types of diagnosis and classification problems. Such problems have a wide variety and large number of inputs (i.e., waveforms, spectra, images, and environmental measurements) which must be correlated to produce an output. The concept is based on research over the last 30 years in neurobiology, with efforts to simulate biological neural network functions (such as pattern recognition) in computers.

A neural network includes a plurality of processing elements called neural units arranged in layers, as shown schematically in FIG. 1. Interconnections are made between units of successive layers. A network has an input layer, an output layer, and one or more "hidden" layers in between. The hidden layer is necessary to allow solutions of nonlinear problems. Each unit functions in some ways analogous to a biological neuron; a unit is capable of generating an output signal which is determined by the weighted sum of input signals it receives and a threshold specific to that unit. A unit is provided with inputs (either from outside the network or from other units) and uses these to compute a linear or non-linear output. The unit's output goes either to other units in subsequent layers or to outside the network. The input signals to each unit are weighted either positively or negatively, by factors derived in a learning process.

When the weight and threshold factors have been set to correct levels, a complex stimulus pattern at the input layer successively propagates between hidden layers, to result in a simpler output pattern, such as only one output layer unit having a significantly strong output. The network is "taught" by feeding it a succession of input patterns and corresponding expected output patterns; the network "learns" by measuring the difference (at each output unit) between the expected output pattern and the pattern that it just produced. Having done this, the internal weights and thresholds are modified by a learning algorithm to provide an output pattern which more closely approximates the expected output pattern, while minimizing the error over the spectrum of input patterns. Neural network learning is an iterative process, involving multiple "lessons". Neural networks have the ability to process information in the presence of noisy or incomplete date and yet still generalize to the correct solution.

In contrast, some other approaches to artificial intelligence, i.e., expert systems, use a tree of decision rules to produce the desired outputs. These decision rules, and the tree that the set of rules constitute, must be devised for the particular application. Expert systems are programmed, and generally cannot be trained. Because it is easier to construct examples than to devise rules, a neural network is simpler and faster to apply to new tasks than an expert system.

FIG. 2 is a schematic representation of a neural unit. Physically a unit may be, for example, one of numerous computer processors or a location in a computer memory. Conceptually, a unit works by weighing all of its inputs, subtracting a threshold from the sum of the weighted inputs, resulting in a single output which may be a binary decision, 1 or 0. However, in practice a network has a more stable operation when each unit's output is smoothed, so that a "soft binary decision" in the range of values between 1 and 0 is delivered.

A unit multiplies each of its inputs with a corresponding weight. This process follows the so-called propagation rule and results in a net input which is the weighted sum of all the inputs. The unit's threshold is subtracted from the weighted sum, to provide a so-called linear decision variable. When the linear decision variable is positive (when the weighted sum exceeds the threshold), a binary decision would be 1; otherwise, the binary decision would be 0. The linear decision variable, however, is passed through a nonlinear mapping so that a range of values between binary 1 and 0 is obtained. The resulting nonlinear output is the smoothed decision variable for the unit which provides a more stable operation. An output near either end of the range indicates a high confidence decision.

The nonlinear mapping is an S-shaped curve output function. When the linear decision variable is very negative, the curve is nearly flat, giving values near the lower end of the range (binary 0 decisions with high confidence). When the linear decision variable is very positive, the curve is again nearly flat, giving values near the upper end of the range (binary 1 decisions with high confidence). Changes in the linear decision variable in the flat regions make very little difference in the unit output. When a unit makes a high confidence decision, it is quite insensitive to moderate changes in its inputs. This means the unit is robust. When the linear decision variable is zero, the mapping gives a unit output at the center of the range. This is interpreted as no decision, a low confidence condition in which 1 and 0 are deemed equally likely. This result is obtained when the weighted sum of inputs is equal to the threshold.

FIG. 3 is the curve of the mapping function $$\frac{1}{1+e^{-x}}$$

wherein the output range is [0,1]; in this case, an output of ½ is interpreted as no decision.

Because the linear decision variable is the weighted sum of all inputs to the unit minus the threshold, the threshold can be considered as just another weight. This way of looking at a unit's operation is useful in considering learning algorithms to adjust weights and thresholds, because it allows a unified treatment of the two.

As previously noted, units are connected together to form layered networks (which are also called manifolds). The inputs to units in the first layer are from outside the network; these inputs represent the external data to the network and are called collectively the network input. The outputs from units in the last layer are the binary decisions that the network is supposed to make and are called collectively the network output. All other units in the network are in so-called hidden layers. All inputs to units, except those in the first layer, are outputs of other units. All outputs from units in the first and hidden layers are inputs to other units. Although a unit has only a single output, that output may fan out and serve as an input to many other units, each of which may weigh that input differently.

Because the nonlinear mapping makes the units robust, neural networks are fault tolerant. If a unit fails, its output no longer reaches other units in the network. If those affected units were previously making high confidence decisions, and if this was based on many inputs (i.e., the network has a high degree of connectivity), this change in inputs will have only a small effect of the output. The result is that the damaged network provides almost the same performance as when undamaged. Any further performance degradation is gradual if units progressively fail.

The performance of a neural network depends on the set (matrix) of weights and offsets. Learning algorithms are intended to compute weights and offsets that agree with a set of test cases (lessons), consisting of known inputs and desired outputs. An adjustment pass is performed for each test case in turn, until some adjustment has been made for all of the cases. This entire process is repeated (iterated) until the weights and thresholds converge to a solution, i.e., a set of values with which the network will give high confident outputs for various network inputs.

For each test case, the mean square error between desired and actual output is calculated as a function of the weights and thresholds. This error is a minimum at some point in parameter space. If training were done with one test case alone, the weights and thresholds would converge to a particular set of values. However, any other test case, whether the desired output is the same or different, will have a different error at each point in parameter space. The appropriate learning is achieved by minimizing the average error, where the average is taken over all test cases. This is why it is desirable to make one adjustment for each test case in turn; the sequence of adjustments is very much like an ensemble average over the test cases. The preferred class of techniques to do this is called back propagation.

An example of a known neural network learning algorithm for a single step of back propagation is shown in FIG. 4. In the algorithm, which is written in Pascal language, the index k is the unit number, running from 0 to uc-1. The parameter uc is the unit count. The index numbers mi to uc-1 correspond to the units in the network. The index numbers 0 to mi-1 correspond to the mi external inputs, i.e., the data, to the neural net. The units with these index numbers can be thought of as dummy units: they have a fixed output (which is the neural net input with that index number), and no inputs, no weights, and no threshold. This artifice is used solely for consistency, so that for the purposes of the algorithm all unit inputs, including those of the first layer, are outputs of other units.

The pass in the forward direction, from input layer to output layer, shows how the algorithm produces outputs for each unit. For the unit numbered k, the inputs are summed with appropriate weights (the variable "ws") and an offset (the variable "ot," equal to minus the unit's threshold) is added. Note that if this code is to calculate the output of a net with instantaneous propagation, all connections must be made from a unit numbered i to a unit numbered k such that k is greater than i. That is, the connection matrix ws must be strictly upper triangular. Inputs from units with higher number are delayed by one sampling interval.

The variable "on" is the linear decision variable of the unit, the weighted sum of unit inputs offset by minus the threshold. The variable "out" is a nonlinear mapping of "on".

The pass in the backward direction, from output layer to input layer, implements the back propagation algorithm. It utilizes the steepest descent gradient for minimizing the mean square error between network output and desired output. The mean square error is $$\sum_k [rf_k - out_k]^2$$

where the sum is over those units that supply network outputs, and "rf" is the reference output desired. The quantity "pf" (the primary feedback, so called for its role in other learning algorithms) is the partial derivative of this error with respect to "on." (There is an overall factor of −2, which is discussed below.) For those units in the output layer which supply network outputs, the derivative can be calculated directly. For units that supply inputs to other units, the calculation requires repeated application of the chain rule. (The derivation is given, for example, in *Learning Internal*

*Representations by Error Propagation,* Chapter 8 of *Parallel Distributed Processing,* Rumelhart, Hinton, and Williams, MIT Press, Cambridge, Mass., 1986.) The algorithm allows for the possibility that a unit will provide both an external network output and an input to other units. The factor of out (1-out) is simply the derivative of the particular nonlinear mapping function (logistic activation function) used, i.e., $$\frac{1}{1+e^{-x}}$$

The final step of the algorithm changes the weights and the thresholds by an amount proportional to the derivative of the error with respect to these quantities. The step size is scaled by the parameter d, which is adjusted empirically. It is possible to make this proportionality constant different for each unit in the network. The factor of $-2$ mentioned above is absorbed in the constant; the minus sign ensures that the step is in the direction of decreasing error.

The threshold can be considered as just another weight, corresponding to a dummy input that is always $+1$ for every unit. If this is done, the weights and thresholds can be treated in exactly the same way.

While this algorithm will in time reach a solution, many passes (iterations) are needed. An object of this invention is to provide a neural network which reaches a solution with significantly fewer iterations than required by the prior art.

SUMMARY OF THE INVENTION

Briefly, according to an aspect of the invention, there is provided a method of accelerating the training of an artificial neural network. A computer is configured as an artificial neural network with a network input and a network output, and having a plurality of interconnected units arranged in layers including an input layer and an output layer. Each unit has a multiplicity of unit inputs and a set of variables for operating upon the unit inputs to provide a unit output. A plurality of examples are serially provided to the network input and the network output is observed. The computer is programmed with a back propagation algorithm for adjusting each set of variables in response to feedback representing differences between the network output for each example and the desired output. The examples are iterated while those values which change are identified. The examples are reiterated and the algorithm is applied to only those values which changed in a previous iteration.

BRIEF DESCRIPTION OF THE DRAWINGS

FIG. 7 is a listing of a back propagation learning algorithm which includes strategic prediction;

FIG. 9 is the curve of a preferred nonlinear mapping function;

FIG. 12 represents a simple three layer network which by adjusting variables can function as a logic gate;

FIG. 13 is a listing of the output of the network of FIG. 12 as the internal variables converge to a solution;

FIG. 14 is a plot of selected cases from the listing of FIG. 13;

FIG. 15 is a listing of an enhanced backward propagation learning algorithm.

DETAILED DESCRIPTION OF THE INVENTION

The preceding background material is incorporated in this detailed description by reference. An understanding of the background material is necessary to comprehend the present invention.

A purpose of the invention is to "teach" neural network, by adjusting weights and offsets (thresholds) to provide optimal solutions to a class of problems.

Figure 5:
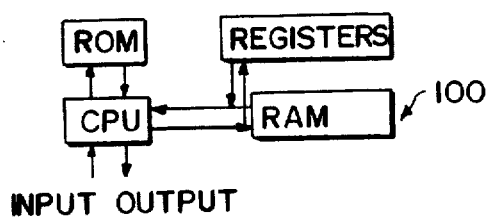
FIGS. 5 and 6 are block diagrams of computers suitable for practicing the invention.
Figure 6:
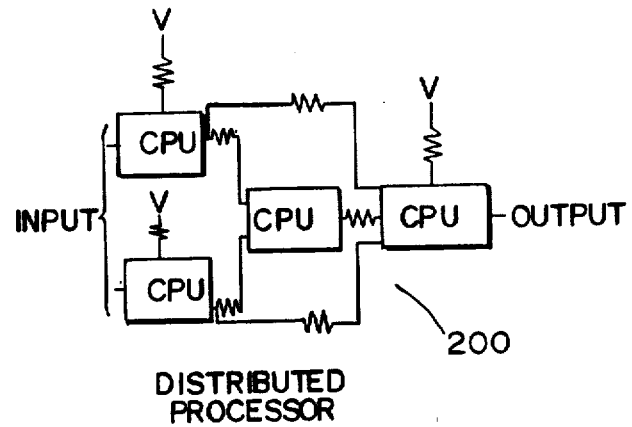

FIGS. 5 and 6 shows block diagrams of computers programmed to practice the invention. The invention is not limited to the type of computer architecture. The computer may be a conventional von Neuman machine 100, as seen in FIG. 5, or a distributed processor machine 200, as seen in FIG. 6, such as a SUN (TM) Microsystem Unix (TM) Workstation. The computer is programmed with a back propagation learning algorithm which, as a feature of the invention, incorporates a "predictor" function which increases the speed of converging on the solution to a problem during the learning process when internal weights and thresholds of individual neural units are determined.

In a von Neuman computer, units are located in memory. Weight correction ripples through units one unit at a time starting at the output layer. In a parallel processor computer, the weight corrections are made on each unit simultaneously.

Figures 1, 8:
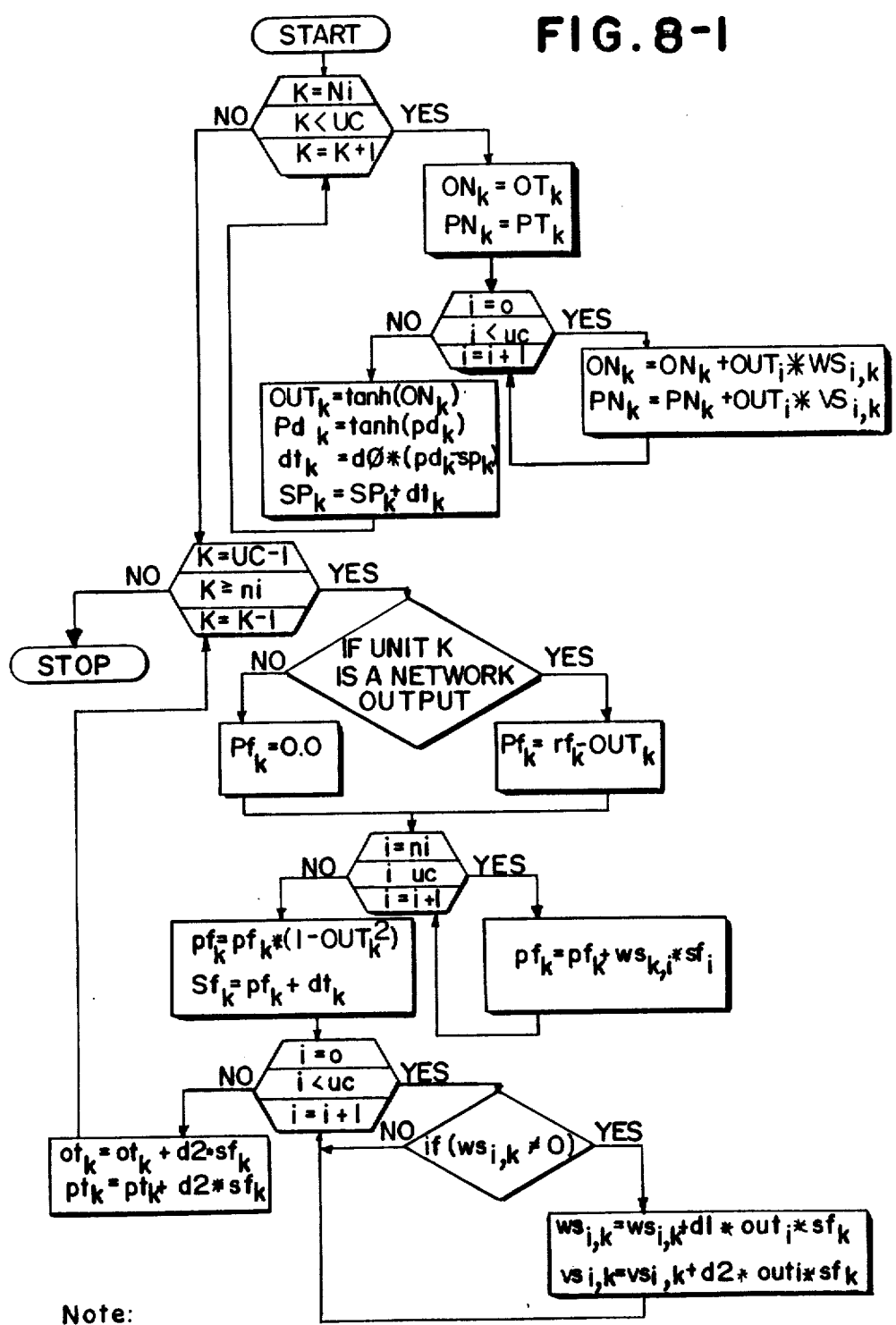
FIG. 8 is a flow diagram of the algorithm listed in FIG. 7.

A single step of an embodiment of the learning algorithm is listed in Pascal in FIG. 7. The corresponding flow diagram is seen in FIG. 8. The preferred nonlinear mapping function is the hyperbolic tangent which, as seen in FIG. 9, takes all real numbers into the set $[-1, +1]$; in this case, an output of $+1$ means a binary 1, while an output of $-1$ means a binary 0. The factor of (1-out$^2$) is the derivative of tanh x is.

Figure 1:
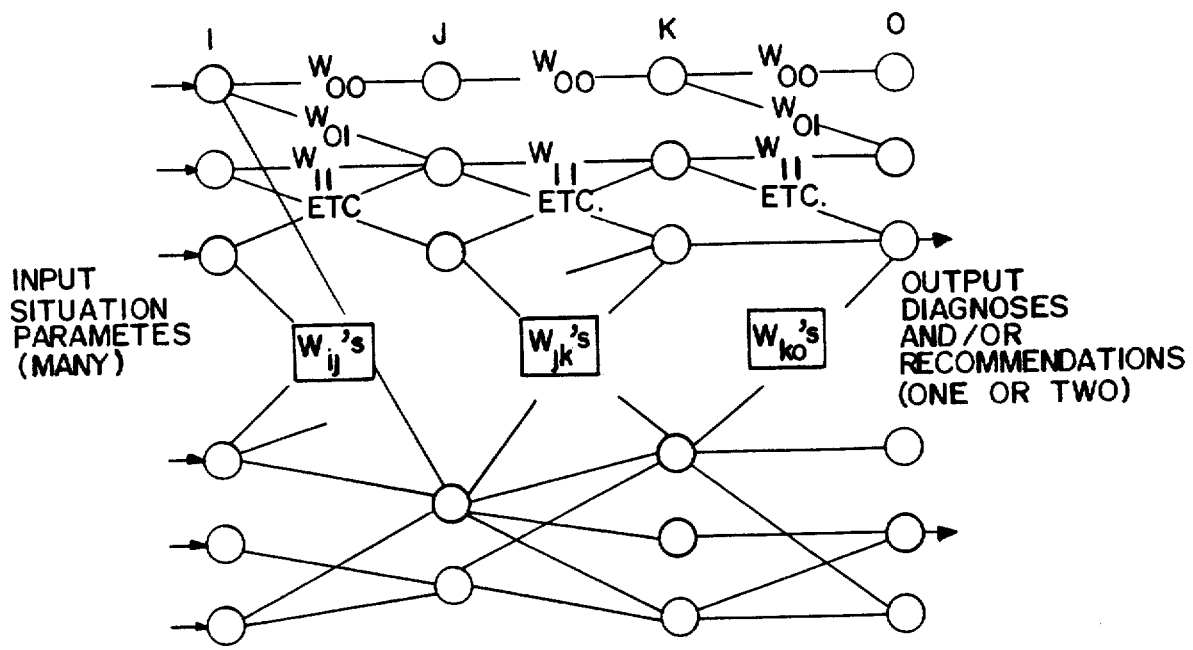
FIG. 1 is a schematic representation of a neural network.
Figure 2:
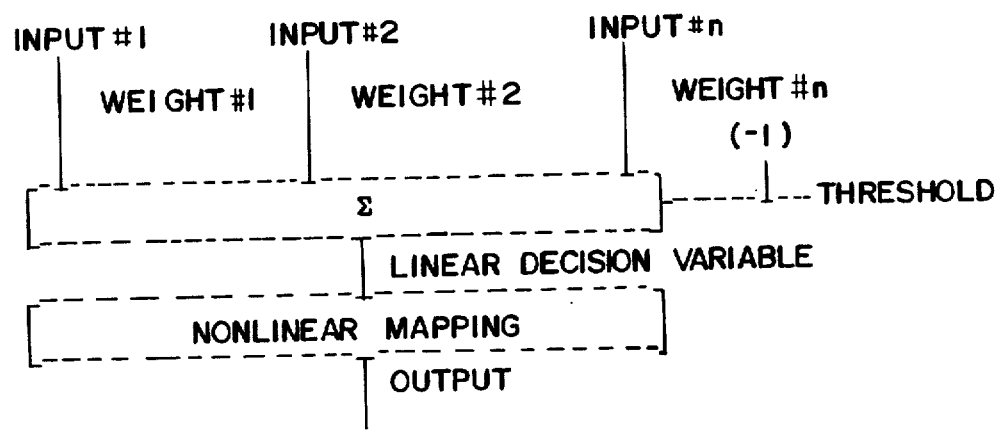
FIG. 2 represents a neural unit, the building block of a neural network.
Figures 3, 4:
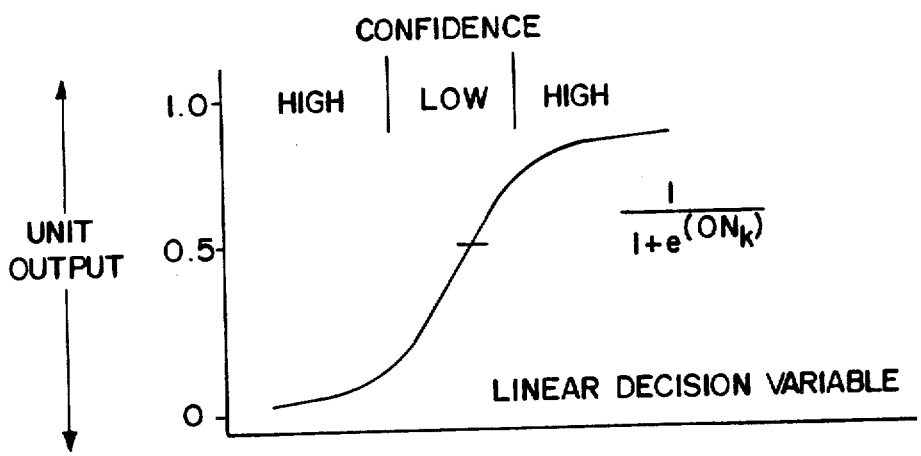
FIG. 3 shows the curve of a nonlinear mapping function.
FIG. 4 is a listing of a back propagation learning algorithm known to the prior art.

Compared with the known back propagation algorithm of FIG. 4, there are novel features which greatly improved the speed of learning.

Figure 10:
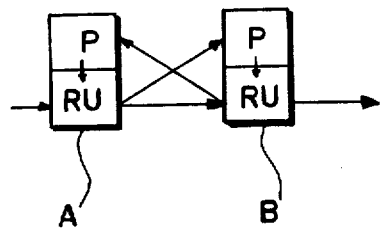
FIG. 10 is a pair of neural units each including a predictive subunit.

Referring to FIG. 10, each unit has two parallel subunits, a real time unit (RU) and a predictive unit (P), each subunit has its own matrix of weights and offsets. In contrast with neural networks having only one link (connection) between each pair of coupled units, the present neural network has a plurality of links between units. In each pass (iteration), two outputs are calculated, "out", and "pd,". The output "pd" is a predicted output for the predictive unit. The output "out" of a real time unit of unit "A" forms the input to the predictive and real time subunits of unit "B" in the subsequent layer. The output of the real time subunit of unit "B" inputs the predictive unit of unit "A" in the previous layer. The difference between the current and previous filtered output, "df", of each predictive unit is directed to its corresponding real time subunit where it is added to the primary feedback "pf" and accelerates the change on the real time matrix.

The predicted output "pd" is passed through a single pole filter to smooth it. The difference in the filtered prediction between the current and previous iterations gives the variable "dt." This variable, called the activation, is used during the learning portion of the algorithm.

The primary feedback "pf" is calculated as in back propagation for units that supply network outputs. However, the change "dt" in the predicted output (the activation) is added to the primary feedback to produce a secondary feedback. This secondary feedback takes the place of the primary feedback in all other places, both in the chain rule calculation of "pf" for other units, and in the adjustment of the weights and offsets (thresholds).

The change for the offset is the same as the change for a weight with an input equal to unity. (Refer briefly to FIG. 12.) The algorithm treats weights and offsets in a unified fashion.

The adjustments for the weights and offsets of the real time and predictive units are analogous. They differ only in the constant of proportionality and their time constants. The predictive weights and offsets have a longer time constant, so they adapt more rapidly to discrepancies between desired and calculated output. This more rapid adaptation will be noisier in many cases, so the aforesaid low pass filtering of the predicted output "pd" is appropriate. Initial weights are low ($\pm 1 \times 10^{-5}$) compared with those of conventional back propagation ($\pm 0.3$).

To review, each unit uses two sets (matrixes) of variables which change at different speeds. The real time matrix contains present weights and offsets (thresholds), in the same manner as does corrected back propagation. The other matrix contains predicative weights and offsets. The predicative matrix represents the history of all previous predictive weights and offsets and tends to filter out noise fluctuations in error signals. Each set of variables operates upon the inputs to the corresponding subunit to provide the output of the subunit.

Figure 11:
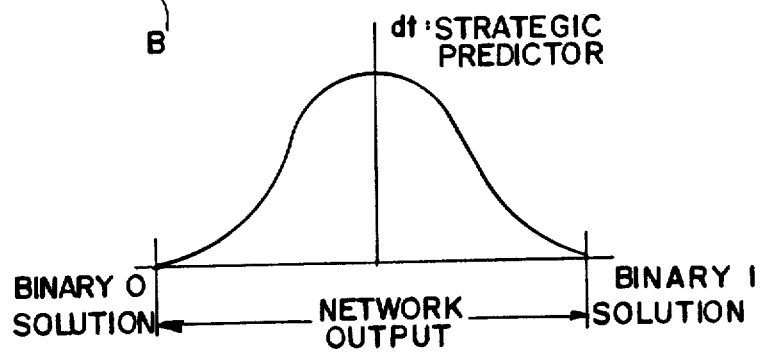
FIG. 11 illustrates the decreasing effect of strategic prediction as the network output nears a solution.

The predicative matrix provides a strategic prediction based on predicatives which causes acceleration of weight convergence in the real time matrix, due to the addition of "dt" to the primary feedback. As seen in FIG. 11, the effect of strategic prediction falls out as the network gets near a solution (binary 1 or 0) because activator "dt" is smaller. This technique is called "gradient decent optimization".

By incorporating a predictive variable in the learning process, the aforedescribed described learning algorithm reaches a solution with significantly fewer iteratives than previously known back-propagation learning algorithms.

FIG. 12 represents a simple three layer network. By selecting sets of variables, the network can function as various logic gates, such as an exclusive-ORgate, which is non-linear, or an ANDgate, which is linear.

Using previously known back propagation algorithms it takes several hundred passes or iteratives to train the network of FIG. 12 to be an exclusive ORgate. Using the described algorithm, the network converges to a correct solution (0,1,0,1) in less than twenty iterations, as seen by the printout reproduced in FIG. 13.

Another method of speeding convergence of values of neural networks is based on the observation that at stages of iteration of back propagation algorithms, both previously known and disclosed herein, there is a particular oscillation of the output of the network, as can be seen in FIG. 13. The signs of the network output converge first, as seen at pass 13, before the magnitudes of network output do. As an additional feature of the invention, there is provided a multiplication of weights and offsets after output sign convergence is observed at the network output. This technique is called "boost".

Suppose that a set of weights and offsets has been found that gives outputs with the correct sign for all test cases. That is, the network has learned to make correct decision for all test cases, though the decisions may have quite low confidence associated with them (that is, the outputs may not be near either binary one or zero). If the network were linear, than a rescaling of all weights and offsets would produce a proportional change in the outputs. Thus, increasing weights and offsets by some constant factor would increase the quality of the decisions. Since the network is usually highly nonlinear, this holds true only for those outputs near the linear region; this region is near zero, where the decisions are of low quality. If, on the other hand, all of the network outputs were of high quality (near the limits of their range), then a proportional increase in all weights and offsets would have a negligible effect on the outputs. This is because the S-shaped nonlinear mapping, as seen in FIG. 9, is very flat in those regions and so insensitive to such changes. This means that such a proportional increase will not degrade performance when the learning algorithm has nearly converged. On the contrary, a proportional increase in weight and offsets greatly improves the quality of most outputs, as seen in FIG. 14. Further iterations of the gradient learning algorithms can restore the quality of any remaining outputs that are degraded by the boost.

The real time sets of values for weights and thresholds obtained for a trained neural network may be transcribed directly into one or more descendant networks. Such a descendant network does not have to go through the learning process experienced by the trained parent network. The sets of weights and thresholds may be fixed in the descendant network as constants, in which case there is no need for a learning algorithm. The descendant network does not have to be identical to the parent network, but when trained is functionally equivalent to in forward pass (input to output). Physically, constant weights can be resistor values coupling distributed amplifiers in an analog computer system or located in ROM for a digital computer system. Alternatively, a descendant network may be adaptive, in which case the transcribed values are changeable and used as a baseline for subsequent modification by a learning algorithm.

Figures 1, 16:
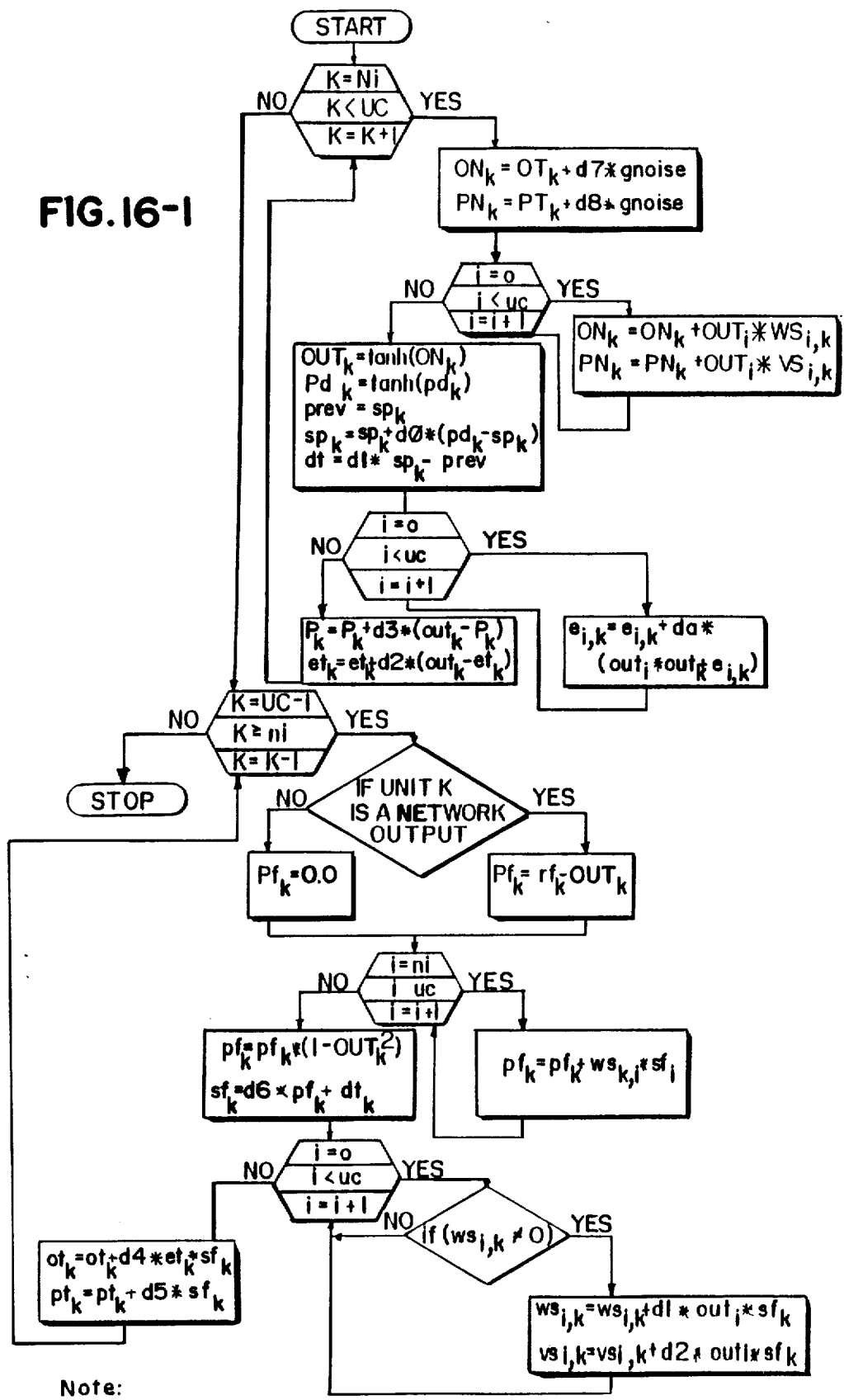
FIG. 16 is a flow diagram for the algorithm of FIG. 15.

Additional features can be added to enhance the algorithm listed in FIG. 7. The program for a single step of an enhanced learning algorithm is listed in Pascal in FIG. 15. The corresponding flow diagram is seen in FIG. 16. One additional feature in the enhanced algorithm is that the difference "dt" (the activation) is not the change in the predicted output if the weight $d_1$ is less than unity. The purpose is to make the activation change sign if the predicted output does not continue to increase. As the activation "dt" is not necessarily zero at convergence, and equilibrium point may be shifted.

Another feature changes the weight $d_6$ with which primary feedback "pf" contributes to the secondary feedback "sf". This is equivalent to changing the time constants $d_4$ and $d_6$ in adjusting weights and offsets, and making a compensating change in the time constant $d_0$ for the predicted output.

Another feature is the addition of Gaussian white noise to the linear decision variables of both the real time and the predictive unit. The same noise ($1 \times 10^{-12}$) is added to both units. The purpose of the noise is to include a small randomization factor to help keep the learning algorithm from being trapped in local solution space minima that are not global minima.

Another feature found in the enhanced learning algorithm is that the adjustments to the real time weights and the predictive weights are done differently in addition to having different time constants. The adjustment for predictive weights "vs" replaces the variable "out," the input to which the weight corresponds, with a filtered variable "p." The analogous adjustment to the offset is the same as with the enhanced learning algorithm, because the corresponding input is the constant unity, which need not be filtered.

The changes to the learning algorithm for adjusting the ordinary weights "ws" are more extensive. The product of one input to a unit and the unit's output is called the eligibility factor for the corresponding weights. It is large when high confidence inputs contribute to high confidence outputs. This eligibility factor is filtered, and the result "e" is used in place of "out" in adjusting the real time weights. When forming "et," which is used to adjust offsets, only the output is filtered. This is because the corresponding input is a dummy input that is constantly unity. (Note that the averages "p" and "et," though logically distinct, differ only in the time constants used to average them.)

In ordinary back propagation, as described in the Background, the adjustment to the variables is proportional to both the primary feedback to the unit and the appropriate input to the unit. In the present learning algorithms, the primary feedback is replaced by secondary feedback. As yet another feature, the adjustment to the feedback may also be proportional to the output from the unit. Those units having an output near binary 1 or 0 will have a larger feedback than outputs midway between. This means that units with little effect elsewhere in the network have correspondingly smaller adjustments.

A further method of updating of weights and offsets is applicable to a neural network using any back propagation learning algorithm. The method consists in accumulating in accumulators proposed changes to the weights and offsets as calculated by the learning algorithm, without changing their values, over some number of iterations during learning. When the predetermined number of iterations is reached, the accumulated changes are added to the current values of weights and offsets, and the accumulators reset to zero.

According to another feature, called eligibility trace. The changes in a unit's weights thresholds are monitored during iterations. Values which are changed are identified. Only those values changed in a previous iteration are subject to the algorithm and thus to change in subsequent iterations.

The best mode of the invention has been described. With these teachings, equivalent alternatives will be apparent to those skilled in the art. Accordingly the scope of the invention should be determined by the claims and equivalents thereof.

What is claimed is:

1. A method of accelerating the training of an artificial neural network comprising the steps of:
   providing a computer configured as an artificial neural network with a network input and a network output, and having a plurality of interconnected units arranged in layers including an input layer and an output layer, each unit having a multiplicity of unit inputs and a set of variables for operating upon said unit inputs to provide a unit output;
   serially providing a plurality of training examples to said network input and observing the network output;
   programming said computer with a back propagation algorithm for adjusting each set of variables in response to feedback representing differences between the network output for each example and a desired output;
   iterating said examples;
   identifying those values which change;
   reiterating said examples; and
   applying said algorithm to only those values which changed in a previous iteration.

* * * * *